United States Patent
Bent et al.

(10) Patent No.: US 11,874,801 B2
(45) Date of Patent: Jan. 16, 2024

(54) DEDUPLICATION IN MULTIPLE-TIERED STORAGE SYSTEMS

(71) Applicant: Seagate Technology LLC, Fremont, CA (US)

(72) Inventors: John Michael Bent, Los Alamos, NM (US); Praveen Viraraghavan, Chicago, IL (US); Tim Shaffer, South Bend, IN (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 0 days.

(21) Appl. No.: 17/670,633

(22) Filed: Feb. 14, 2022

(65) Prior Publication Data

US 2023/0259494 A1 Aug. 17, 2023

(51) Int. Cl.
*G06F 16/17* (2019.01)
*G06F 16/174* (2019.01)

(52) U.S. Cl.
CPC ................ *G06F 16/1748* (2019.01)

(58) Field of Classification Search
CPC .................................................. G06F 16/1748
See application file for complete search history.

(56) References Cited

U.S. PATENT DOCUMENTS

| | | | |
|---|---|---|---|
| 8,290,972 B1 | 10/2012 | Deshmukh et al. | |
| 9,122,407 B2 | 9/2015 | Tsuchiya et al. | |
| 10,210,188 B2 | 2/2019 | Tripathy et al. | |
| 10,303,797 B1 | 5/2019 | Menezes et al. | |
| 10,540,327 B2 | 1/2020 | Ngo et al. | |
| 2011/0307447 A1 | 12/2011 | Sabaa et al. | |
| 2012/0150826 A1 | 6/2012 | Vijayan Retnamma et al. | |
| 2017/0364704 A1* | 12/2017 | Wright | G06F 21/6227 |
| 2020/0081643 A1 | 3/2020 | Sharma et al. | |
| 2022/0197526 A1* | 6/2022 | Murti | G06F 9/5083 |

OTHER PUBLICATIONS

J. Blasco et al., "A Tunable Proof of Ownership Scheme for Deduplication Using Bloom Filters", 2014 IEEE Conference on Communications and Network Security, Jun. 18, 2014, pp. 481-489.

* cited by examiner

*Primary Examiner* — Apu M Mofiz
*Assistant Examiner* — Cindy Nguyen
(74) *Attorney, Agent, or Firm* — Westman, Champlin & Koehler, P.A.

(57) ABSTRACT

A method includes receiving a piece of data at an upper-layer server of a multi-tiered storage system comprising the upper-layer server and a block server, and determining a signature for the piece of data. A first bloom filter stored on the upper-layer server is a copy of a second bloom filter stored on the block server. The first bloom filter is checked for the signature. When a match is found in the first bloom filter, the piece of data is sent for storage at the block server, and it is verified at the block server whether a match is present for the piece of data. When a match is present, the piece of data is deduplicated. When a match is not present, the piece of data is stored. When a match is not found in the first bloom filter, the piece of data is stored in the block server.

18 Claims, 6 Drawing Sheets

DEDUPLICATION IN MULTIPLE-TIERED STORAGE SYSTEMS

SUMMARY

In one embodiment, a method includes receiving a piece of data at an upper-layer server of a multi-tiered storage system comprising the upper-layer server and a block server, and determining a signature for the piece of data. A first bloom filter stored on the upper-layer server is a copy of a second bloom filter stored on the block server. The first bloom filter is checked for the signature. When a match is found in the first bloom filter, the piece of data is sent for storage at the block server, and it is verified at the block server whether a match is present for the piece of data. When a match is present, the piece of data is deduplicated. When a match is not present, the piece of data is stored. When a match is not found in the first bloom filter, the piece of data is stored in the block server.

In another embodiment, a method includes storing, for each block server of a plurality of block servers, a set of deduplication signatures for data on the respective block server. A bloom filter is generated for the set of deduplication signatures on each respective block server. Each bloom filter is stored on its respective block server. A plurality of bloom filters are replicated to each of the plurality of upper-layer servers. A piece of data to be stored is received at one upper-layer server of the plurality of upper-layer servers. A signature is determined for the piece of data. The piece of data is deduplicated based on matching the determined signature to a signature stored in a one of the plurality of replicated bloom filters. The piece of data is stored to a block server based on not matching the determined signature to any signature stored in the plurality of replicated bloom filters.

In yet another embodiment, a system includes an upper-layer server configured to receive data for storage in the system, a block server communicatively coupled to the upper-layer server to store the received data, and a controller. The controller is configured to deduplicate the received data and data stored on the block server by performing a method. The method includes determining a signature for the received data, and checking a first bloom filter stored on the upper-layer server, the first bloom filter being a copy of a second bloom filter stored on the block server, for the signature. When a match is found in the first bloom filter, the received data is sent for storage at the block server, and it is verified at the block server whether a match is present for the received data. When a match is found, the received data is deduplicated. When a match is not found, the received data is stored. When a match is not found in the first bloom filter, the received data is stored in the block server.

Other features and benefits that characterize embodiments of the disclosure will be apparent upon reading the following detailed description and review of the associated drawings.

DETAILED DESCRIPTION OF ILLUSTRATIVE EMBODIMENTS

Embodiments of the disclosure relate to cooperative deduplication in multi-tiered storage systems. In one embodiment, a plurality of upper-layer servers and a plurality of block servers are provided. Each upper-layer server contains a bloom filter for each of the block servers. Each block server contains its own bloom filter and set of deduplication signatures for the data stored therein. Data to be stored in the multi-tiered storage system is received at an upper-layer server. A signature for data to be stored is compared to the bloom filters on the upper-layer servers, and when a match is found, deduplication or verification of the presence of the data in a block server is performed. When no match is found, the data is stored to a block server.

Figure 1:
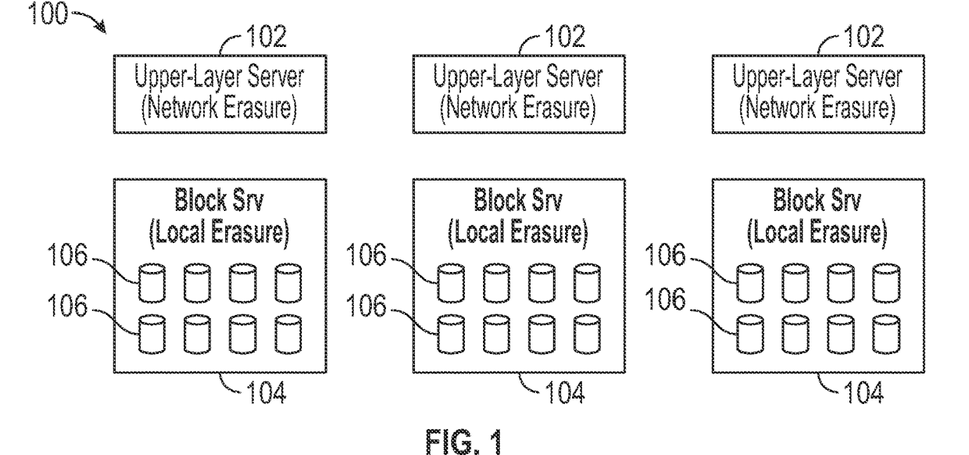
FIG. 1 is a block diagram of a representative system on which embodiments of the present disclosure may be practiced.

Prior to providing a detailed description of the different embodiments, one example of an illustrative operating environment in which certain specific embodiments disclosed herein may be incorporated is shown in FIG. 1. The operating environment shown in FIG. 1 is for illustration purposes only. Embodiments of the present disclosure are not limited to any particular operating environment such as the operating environment shown in FIG. 1. Embodiments of the present disclosure are illustratively practiced within any number of different types of operating environments.

It should be noted that the same or like reference numerals are used in different figures for same or similar elements. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

It will be understood that, when an element is referred to as being "connected," "coupled," or "attached" to another element, it can be directly connected, coupled or attached to the other element, or it can be indirectly connected, coupled, or attached to the other element where intervening or intermediate elements may be present. In contrast, if an element is referred to as being "directly connected," "directly coupled" or "directly attached" to another element, there are no intervening elements present. Drawings illustrating direct connections, couplings or attachments between elements also include embodiments, in which the elements are indirectly connected, coupled or attached to each other.

FIG. 1 is a diagrammatic illustration of a multiple-tiered system 100 in which data deduplication is carried out in accordance with certain embodiments of the present disclosure. The multi-tiered system 100 shows a basic multi-level architecture of a first set of upper-layer of servers 102, and a second set of block servers 104. The block servers 104 are in one embodiment RBODs (RAID bunch of disks, where RAID is redundant array of inexpensive disks), in which a large number of individual drives 106 are configured as a small number of highly reliable giant drives. The upper-layer servers 102 are upper-layer systems including software-based scalable object storage capable of operating with a number of block-layer servers (e.g., the block-layer servers 104). The upper-layer servers 102 and the software thereon create a single server namespace across the set of block-layer servers 104.

Deduplication is a technique to reduce the amount of physical storage capacity consumed as a ratio of logical data that is stored. At a basic level, multiple users may store the same piece of data, or a single user may store the same piece of data multiple times. At a physical level, it is desirable to only store the physical data once. At a logical level, metadata is stored for each instance of the piece of data. The metadata points to the physical location for each of the instances. The logical table of metadata will contain multiple pointers to the same piece of data where multiple instances are present, but only one copy of the data is physically stored. Reference counting and checking may be used to make sure that a piece of data is not deleted when one of its metadata pointers is removed. In this way, deletion of one logical copy does not delete physical data if the physical data is associated with more than one logically stored data. Like all methods of data reduction, deduplication can reduce the ratio between the number of bytes of logical data stored and the number of bytes of physical storage consumed.

In general, to implement deduplication, a block of data is identified by a signature which is typically generated via a hash, fingerprint, checksum, or the like, of the data. To implement deduplication, a block of data is identified by a signature which is typically generated via a hash of the data. The signature of a new block of data is generated and compared with the set of signatures currently stored. If there is match, then the new block need not be actually physically stored; instead, the system metadata is merely updated to increase the reference count for the single copy of the physical data actually stored.

It should be noted that there may actually be more than one copy of a piece of data on a system if the system is doing replication. However, the amount of physical data stored is bounded by the number of replicas, and not by the number of times a logical piece of data is stored. For example, assume a 3-way replicated system into which the same image is stored one million times. In a non-deduplicated system, this image will actually be stored three million times. In a deduplicated system, this image will only be stored three times.

Signature collisions may occur. However, typical deduplication systems do a full verify of the data to protect against hash collisions. This is addressed further below. The type of deduplication employed in embodiments of the present disclosure may be varied. For example, deduplication may be done with sliding window deduplication or fixed block deduplication. The method of actual deduplication may be varied without departing from the scope of the disclosure.

In large systems, there is a very large number of signatures for stored data. This presents scalability challenges. Embodiments of the present disclosure handle these challenges via cooperative processes.

One efficient embodiment includes using a plurality of upper-layer servers and a plurality of and block servers. Each upper-layer server contains a bloom filter for each of the block servers. Each block server contains its own bloom filter and set of deduplication signatures for the data stored therein. Bloom filters are a fast, low-overhead mechanism by which to answer questions of the form "Does item X exist in set S?" Another characteristic of bloom filters is that false positives are possible, but false negatives are not. That is, in response to the question "does item X exist in set S?", a bloom filter will either answer "yes" or "no". If the answer is "no", then it is guaranteed that X is not in S. If the answer is "yes", then it is only probabilistically true that X is in S (e.g., even though the bloom filter says "yes", it is possible that X is not in S). A typical bloom filter has a false positive rate of around 2%. The size of a bloom filter may be chosen based on the amount of data represented so as to have a false positive rate that is acceptably low.

Table 1 shows a possible sequence of operations for an exemplar bloom filter:

TABLE 1

| Operation | Return | Comments |
| --- | --- | --- |
| Insert A into X | Success | Insert a first item |
| Insert B into X | Success | Insert a second item |
| Insert C into X | Success | Insert a third item |
| Query A in X? | Yes | True Positive |
| Query B in X? | Yes | True Positive |
| Query C in X? | Yes | True Positive |
| Query D in X? | No | True Negative |
| Query E in X? | No | True Negative |
| Query F in X? | Yes | False Positive |

A basic bloom filter is a signature (e.g., a hash, checksum, fingerprint) and a bit map. Each piece of data to be represented in the bloom filter is put into the signature (e.g., hash) function which returns a few integers. The bit map for each entry in the bloom filter is set initially to all zeros. When an item is inserted, the integers returned by the hash function are used as indices into the bit map and the corresponding bits are set to 1. When an item is queried, the integers returned by the hash function are again used as indices into the bit map. If all of the specified bits are 1, this means that either the queried item was previously inserted, or other items happened to set those bits to 1. If any of the bits are zero, then this is guaranteed to mean that the item was not previously inserted, because if it had been inserted then all bits would be 1.

For example, presume a simple bloom filter with an 8-bit bit map and a hash function that returns two integers. Table 2 shows the bit map value at the time of each operation:

TABLE 2

| Operation | Hash Output | Bitmap Value | Query Result |
|---|---|---|---|
| Initialize | n/a | 0000 0000 | n/a |
| Insert A | (2, 6) | 0010 0010 | n/a |
| Insert B | (0, 7) | 1010 0011 | n/a |
| Insert C | (2, 4) | 1010 1011 | n/a |
| Query A | (2, 6) | 1010 1011 | Yes (true positive) |
| Query D | (2, 5) | 1010 1011 | No (true negative) |
| Query F | (2, 7) | 1010 1011 | Yes (false positive) |

As can be seen in Table 2, the query of F returns a false positive because the queried bits in index locations 2 and 7 both have a 1 value. This is not because F was inserted. Instead, it is simply that F's two queried bits had been set previously by other inserted items (e. g., A set the 2nd bit and B set the 7th bit). This is the fundamental trade-off of bloom filters: in exchange for very low overhead, they can return false positives.

Because of additional data being written to the storage system over time, a bloom filter will degrade over time as more and more bits are set in the bit map and items are removed from the set. There are multiple ways to address this. One, use a larger bloom filter to increase the number of bits and thereby maintain a low false positive rate for a longer period of time. Two, occasionally reset the bit map by re-initializing it to zero and reinserting all the items. Three, use more advanced versions of bloom filters (not described herein) which support a remove operation.

Figure 2:
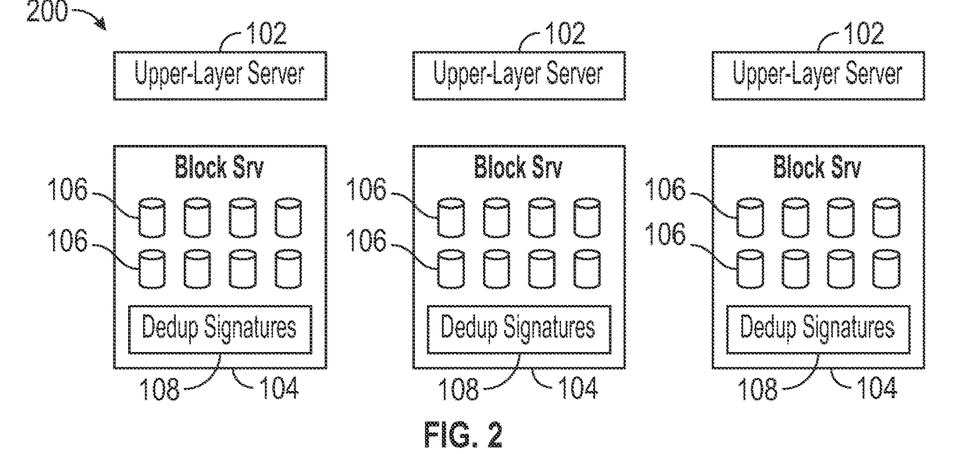
FIG. 2 is a block diagram of a method according to an embodiment of the present disclosure.
Figure 3:
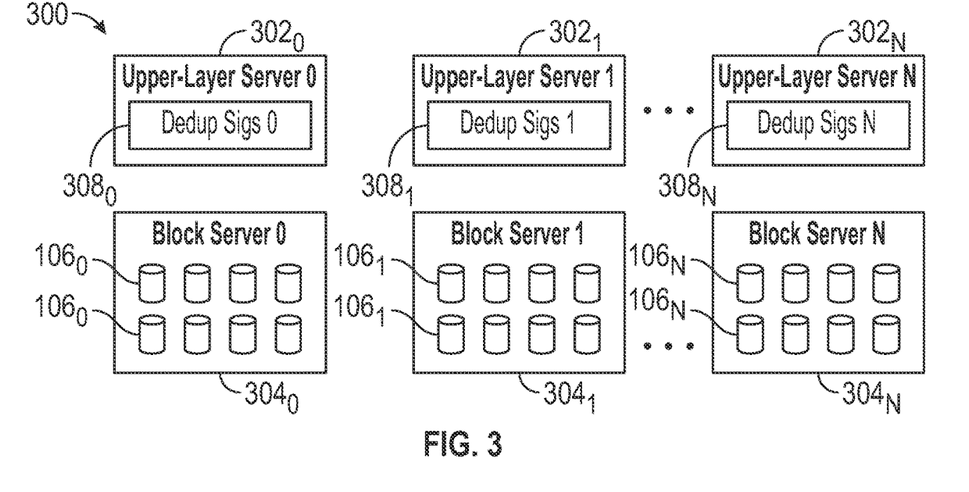
FIG. 3 is a block diagram of a method according to another embodiment of the present disclosure.
Figure 4:
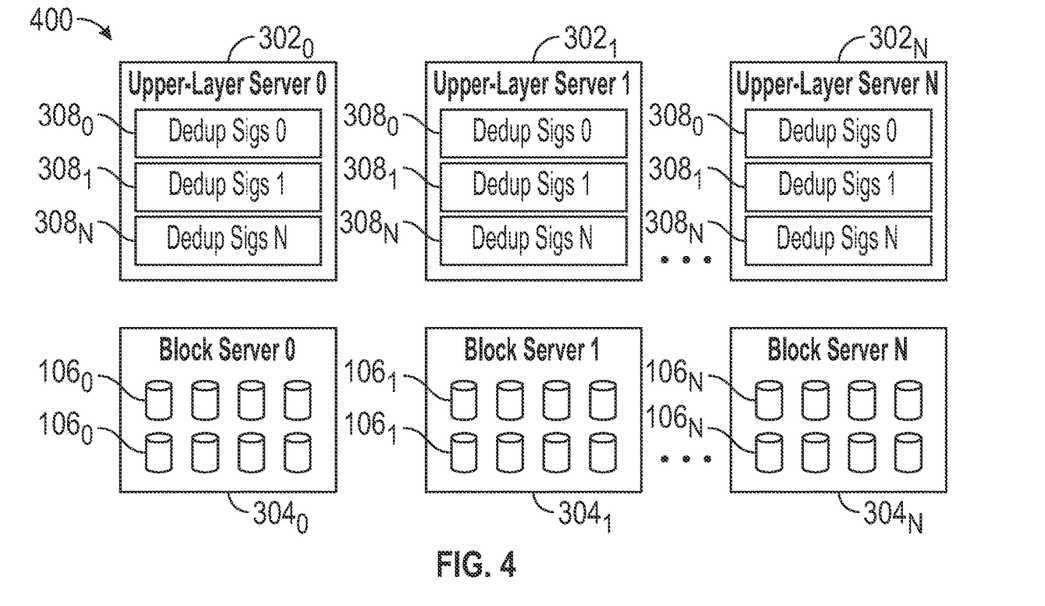
FIG. 4 is a block diagram of a system according to an embodiment of the present disclosure.

There are a number of deduplication techniques that may be implemented in a multi-tiered system, with varying degrees of efficiency and effectiveness. FIGS. 2-4 show three such techniques that are somewhat effective but have downsides.

Two basic naïve implementations of deduplication in a multi-tiered system such as system 100 are shown, respectively, in FIGS. 2 and 3. FIG. 2 performs all deduplication at the local block server level. FIG. 3 performs all deduplication at the upper-layer server level.

System 200 performing local only deduplication is shown in FIG. 2. In FIG. 2, each block server maintains its own set of deduplication signatures 108. In this approach, the upper-layer servers are completely ignorant of which block server is already storing particular signatures. For example, presume storing 100 copies of the same image into this system 200. For each image, an upper-layer server 102 will pseudorandomly select a block server 104 to store it in, such that on the order of 33 copies will be sent to each block server 104. Once the copies arrive at their individual block server 104, they will be deduplicated, but the resulting overall system 200 will have three copies of the image, whereas ideally it would just have one.

System 300 performing global only deduplication is shown in FIG. 3. In this approach, a global set of deduplication signatures are determined and stored at upper-layer servers 302 (designated $302_0$, $302_1$, . . . , $302_N$). Deduplication signatures 308 (designated $308_0$, $308_1$, . . . , $308_N$) are sharded, such that each upper-layer server $302_0$, $302_1$, . . . , $302_N$ only stores the signatures $308_0$, $308_1$, . . . , $308_N$ for the specific block server 304 (designated $304_0$, $304_1$, . . . , $304_N$) which it serves. Data is stored in RBODs $106_0$, $106_1$, . . . , $106_N$ of block servers $304_0$, $304_1$, . . . , $304_N$. A problem with this approach is that it introduces a global broadcast between upper-layer servers $302_0$, $302_1$, . . . , $302_N$ for each new piece of data stored. For example, imagine that server $302_0$ is asked to store an image, and it determines signature S from the image. That server $302_0$ will have to query every other server for a copy of S. This is prohibitively expensive and becomes increasingly expensive as the system 300 is scaled up.

A system 400 of replicated global only deduplication is shown in FIG. 4. In system 400, all global signatures $308_0$, $308_1$, . . . , $308_N$ are stored on every upper layer server $302_0$, $302_1$, . . . , $302_N$. This approach avoids the broadcast on query of system 300, but requires a very large amount of upper-server $302_0$, $302_1$, . . . , $302_N$ capacity overhead to store all the global signatures $308_0$, $308_1$, . . . , $308_N$. It additionally requires expensive maintenance of the replicated signatures $308_0$, $308_1$, . . . , $308_N$. At an extreme, broadcasts would be required at all write operations so that every upper-layer server $302_0$, $302_1$, . . . , $302_N$ could correctly track the global signatures $308_0$, $308_1$, . . . , $308_N$.

Figure 5:
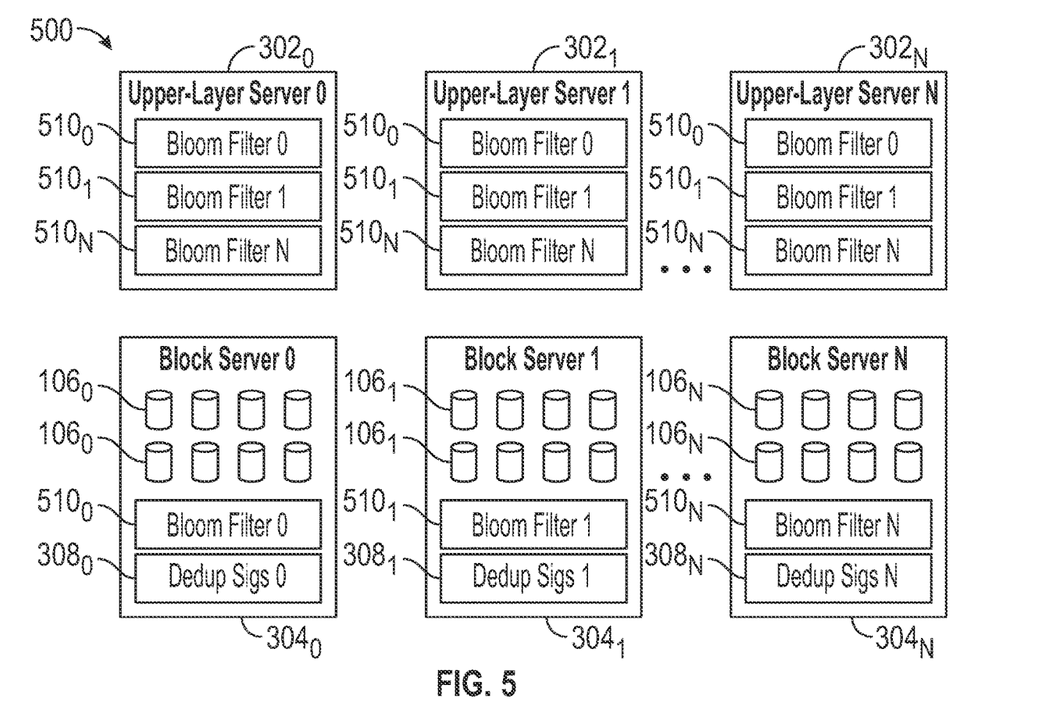
FIG. 5 is a block diagram of a system according to an embodiment of the present disclosure.

A system 500 of multi-tiered deduplication using a system of cooperative communication between upper-layer servers $302_0$, $302_1$, . . . , $302_N$ and block servers $304_0$, $304_1$, . . . , $304_N$. Block servers $304_0$, $304_1$, . . . , $304_N$ store data on their respective RBODs $106_0$, $106_1$, . . . , $106_N$, deduplication signatures $308_0$, $308_1$, . . . , $308_N$, and with bloom filters $510_0$, $510_1$, . . . , $510_N$. Replicated bloom filters $510_0$, $510_1$, . . . , $510_N$ are also stored on the upper-layer servers $302_0$, $302_1$, . . . , $302_N$. The bloom filters $510_0$, $510_1$, . . . , $510_N$ stored on upper-layer servers $302_0$, $302_1$, . . . , $302_N$ are potentially stale, as they are occasionally copied from the block server bloom filters $510_0$, $510_1$, . . . , $510_N$ to the upper-layer servers $302_0$, $302_1$, . . . , $302_N$. Because a bloom filter's size is a very small percentage of the size of the actual data set, this is a reasonable amount of metadata to maintain at each upper-layer server $302_0$, $302_1$, . . . , $302_N$.

Periodic publication of the bloom filters $510_0$, $510_1$, . . . , $510_N$ stored on the block servers $304_0$, $304_1$, . . . , $304_N$ may be done on an as-needed basis, or scheduled. For example, one frequency of publishing may be synchronously every time the bloom filters $510_0$, $510_1$, . . . , $510_N$ on the block servers $304_0$, $304_1$, . . . , $304_N$ change, but this would be fairly expensive in processing time. Alternatively, the bloom filters $510_0$, $510_1$, . . . , $510_N$ from the block servers $304_0$, $304_1$, . . . , $304_N$ could be broadcast to the upper-layer servers $302_0$, $302_1$, . . . , $302_N$ at a regular interval. As an option in the middle ground, bloom filter updates to the upper-layer servers may be piggybacked onto existing communications. Each block server $304_0$, $304_1$, . . . , $304_N$ could easily maintain an updated bloom filter $510_0$, $510_1$, . . . , $510_N$ for its own block store, and then piggyback that on existing communication between the block server and the upper-layer servers $302_0$, $302_1$, . . . , $302_N$.

When a piece of data is received at the upper-layer servers $302_0$, $302_1$, . . . , $302_N$, a signature for the piece of data is determined, and the bloom filters $510_0$, $510_1$, . . . , $510_N$ for the upper-layer server receiving the data are checked for matches. If a match is found, metadata is present that is pointing to the already stored data. If no match is found, the piece of data is stored.

For example, an image J is being PUT (e.g., written) into upper-layer server $302_0$. Upper-layer server $302_0$ determines the signature for the image J and receives a positive query result for that signature in bloom filter $510_1$, indicating the image J is already stored in block server $304_1$. Upper-layer server $302_0$ sends the image for storage to block server $304_1$, since there is a small chance of a false positive. The current and most up to date bloom filter $510_1$ is checked at $304_1$, and even if the signature is detected, verification is completed to rule out a false positive result from the bloom filter $510_1$. If image J is already present in $304_1$, it is deduplicated. If image J is not present, it cannot be deduplicated, and is stored in block server 304₁. Storage in block server 304₁ is as good as any other block server, since the image J has to be stored somewhere.

Figure 6:
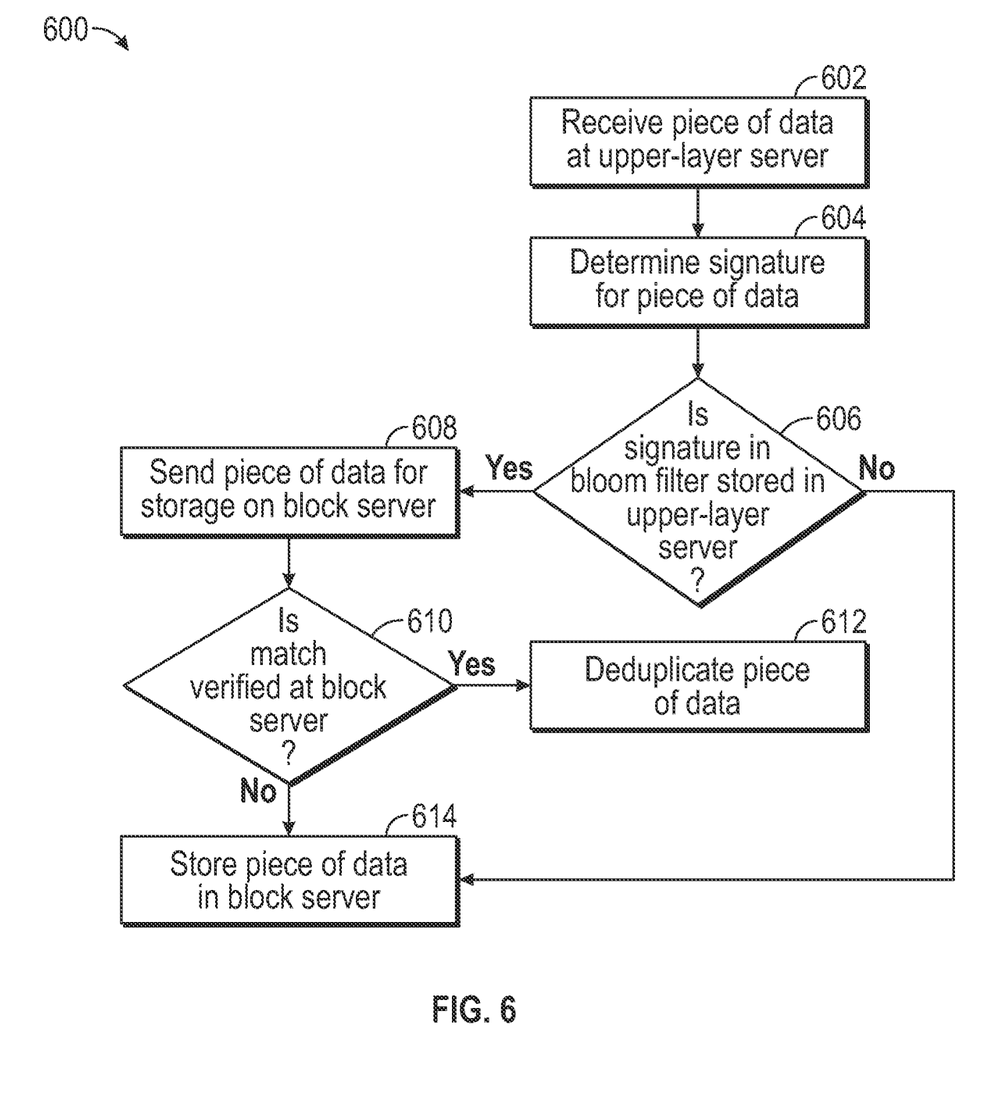
FIG. 6 is a flow chart diagram of a method according to an embodiment of the present disclosure.

Accordingly, a method 600 for deduplication in a multi-tiered system is shown in flow chart form in FIG. 6. Method 600 comprises, in one embodiment, receiving a piece of data at an upper-layer server of a multi-tiered storage system 602. The multi-tiered system includes the upper-layer server and a block server. A signature is determined for the piece of data in block 604. A bloom filter stored on the upper-layer server is checked for the signature in decision block 606. In one embodiment, the bloom filter is a copy of a bloom filter for the block server. When a match is found in the bloom filter on the upper-layer server, the piece of data is sent for storage at the block server in block 608, and it is verified at the block server whether an actual match to the data is present in the block server in decision block 610. When an actual match is found, the piece of data is deduplicated in block 612. When an actual match is not found, the piece of data is stored in the block server in block 614. When a match is not found in the bloom filter, the piece of data is stored in the block server in block 614.

The upper-layer server and the block server may in one embodiment be a plurality of upper-layer servers and a plurality of block servers, each bock server generating and maintaining its own set of deduplication signatures and bloom filter for that particular block server. Receiving then comprises receiving at one of the plurality of upper-layer servers. Checking a bloom filter comprises checking the plurality of bloom servers for the one upper-layer server of the plurality of upper-layer servers. Sending the piece of data for storage at the block server comprises sending the piece of data to the block server on which the signature match is found in the plurality of bloom filters. Determining a signature for the piece of data comprises breaking the piece of data into a plurality of blocks of data, and determining a signature for each block of the plurality of blocks. Verifying comprises checking the bloom filter for the block server.

It should be noted that a stale bloom filter on an upper-layer server will not affect correctness. The worst case is that deduplication opportunities may be missed on occasion, for example if the same new item is PUT more than once during a stale window (note that it will be a new item because if an old item is PUT during a stale window, then it will already exist within the stale bloom filters). It is further noted that the likelihood of false positives due to stale bloom filters, or missed deduplication opportunities, may be lowered by increasing the frequency of bloom filter updates.

Figure 7:
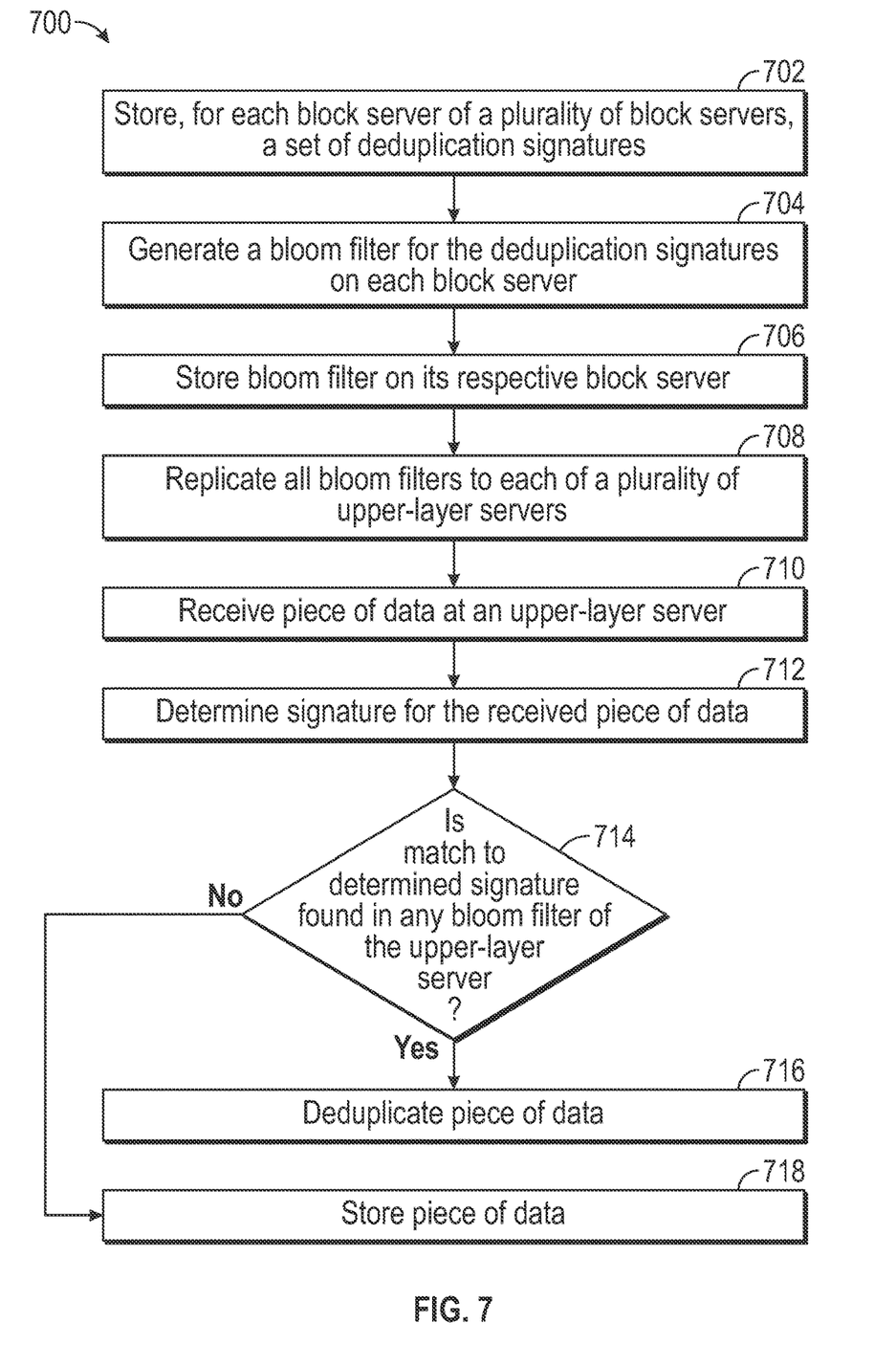
FIG. 7 is a flow chart diagram of a method according to another embodiment of the present disclosure.

Another method 700 for deduplication in a multi-tiered system is shown in flow chart form in FIG. 7. Method 700 comprises, in one embodiment, storing, for each block server of a plurality of block servers, a set of deduplication signatures for data on its respective block server in block 702. A bloom filter is generated in block 704 for the set of deduplication signatures on each respective block server. Each bloom filter is stored on its respective block server in block 706. A plurality of bloom filters are replicated on each upper-layer server in block 708. Each bloom filter of the plurality of bloom filters on each upper-layer server represents one of the plurality of block servers. A piece of data to be written is received at one upper-layer server of the plurality of upper-layer servers in block 710. A signature is determined for the piece of data in block 712. A determination of whether a match is present in the stored set of bloom filters for the upper-layer server is made in decision block 714. The piece of data is deduplicated based on matching the signature to a signature stored in a one of the plurality of bloom filters in block 716. The piece of data is stored based on not matching the signature to any signature stored in the plurality of bloom filters in block 718.

In one example, deduplicating comprises checking the plurality of bloom filters stored on the one upper-layer server for a bloom filter match for the determined signature. When a match for the determined signature is found in a bloom filter of the plurality of bloom filters stored on the upper-layer server, the method may further comprise sending the piece of data for storage at the block server where the match is found in the bloom filter of the plurality of bloom filters stored in the one upper-layer server, and verifying, at the block server, whether a match of the piece of data is present, deduplicating the piece of data when a match is found, and storing the piece of data when a match is not found. When a match for the determined signature is not found in a bloom filter of the plurality of bloom filters stored on the upper-layer server, the piece of data may be stored in the block server where the match is found in the bloom filter of the plurality of bloom filters stored in the one upper-layer server. In one example, replicating the plurality of bloom filters comprises storing the bloom filter for each block server to each of the plurality of upper-layer servers on a predetermined schedule. Receiving, in one example, comprises receiving at one of a plurality of upper-layer servers, each upper-layer server of the plurality of upper-layer servers storing a plurality of bloom filters, a bloom filter for each of the block servers. Checking a bloom filter comprises, in one example, checking the plurality of bloom servers for the upper-layer server. In an example, sending the piece of data for storage at the block server comprises sending the piece of data to the block server on which the signature match is found in the plurality of bloom servers. Determining a signature for the piece of data in one example comprises breaking the piece of data into a plurality of blocks of data, and determining a signature for each block of the plurality of blocks. In one example, verifying comprises checking the bloom filter for the block server. A current bloom filter for each block server is pushed to each upper-layer server on a predetermined schedule in one example.

A system according to an embodiment may comprise an upper-layer server (or plurality of upper-layer servers) to receive data to be written, a block server (or plurality of block servers), the block server(s) communicatively coupled to the upper-layer server(s) to store the data to be written, and a controller, the controller configured to deduplicate the received data and data stored on the block server by the methods described herein.

Table 3 shows a representative system on which embodiments of the present disclosure may be practiced, with mathematical examples for storing the same image on the system of Table 3 shown in Table 4.

TABLE 3

| | |
|---|---|
| Upper-layer servers | 100 |
| Block servers | 100 |
| Block server capacity | 1 pebibyte (PiB) |
| Items stored per block server | 1 billion |
| Bytes in a signature | 256 |
| Bytes in a bloom filter for each item | 1 (standard for a 2% false positive rate) |

Mathematical evaluation of the exemplar when storing the same image one million times:

TABLE 4

| Approach | Physical Copies of image | Deduplication metadata per server | Performance degradation |
| --- | --- | --- | --- |
| No deduplication | 1 million | 0 | None |
| Naïve local (FIG. 2) | 100 | 0 | None |
| Naïve global - sharded (FIG. 3) | 1 | 256 gigabyte (GB) | Broadcast query on PUT |
| Naïve global - replicated (FIG. 4) | 1 | 25 terabyte (TB) | Broadcast update on PUT |
| Multi-tiered deduplication (FIG. 5) | ~1 | 100 GB | None |

Note that the number of physical copies of the image stored with the multi-tiered deduplication (FIG. 5) is identified as approximately one instead of exactly one due to the possibility that a deduplication opportunity could be missed during a brief period when a bloom filter is stale.

Benefits of the multi-tiered deduplication approach of FIG. 5 are clear from a review of Table 4. Vertical integration and codesign of the upper-layer servers, block servers, and bloom filters improves deduplication over all other shown methods, with a lower number of physical copies than other approaches with no performance degradation. Vertical integration also reduces the amount of metadata and eliminates performance degradation versus other approaches that store the same number (or virtually the same number) of physical copies of the image. That is, the embodiment of FIG. 5 realizes near universal deduplication rates at a fraction of the overhead that exists in a single tiered solution.

Figure 8:
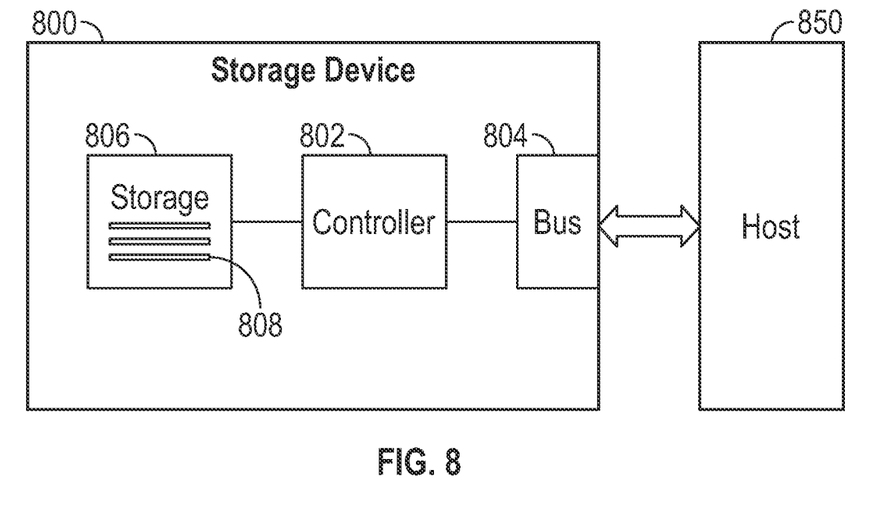
FIG. 8 is a block diagram of a data storage device on which embodiments of the present disclosure may be used.

Referring now to FIG. 8, a simplified block diagram of a representative storage system 800 that may be used as an RBOD disc in embodiments of the disclosure is shown. Storage system 800 may be a hard disc drive (HDD) with a platter or platters 808, a read head, and associated controllers (not shown). System 800 may include, by way of example, a controller 802 couplable via a bus 804 or the like to a host system 850, where the host system 850 may provide power over the bus 804 or through a separate power bus (not shown), and a storage component 806 (such as a spinning disk or platter of disks 808). Controller 802 is configured to carry out deduplication in accordance with one or more of the methods described above. To carry out the deduplication, the controller 802 may execute instructions stored on any tangible computer-readable medium/memory in storage system 800.

Figure 9:
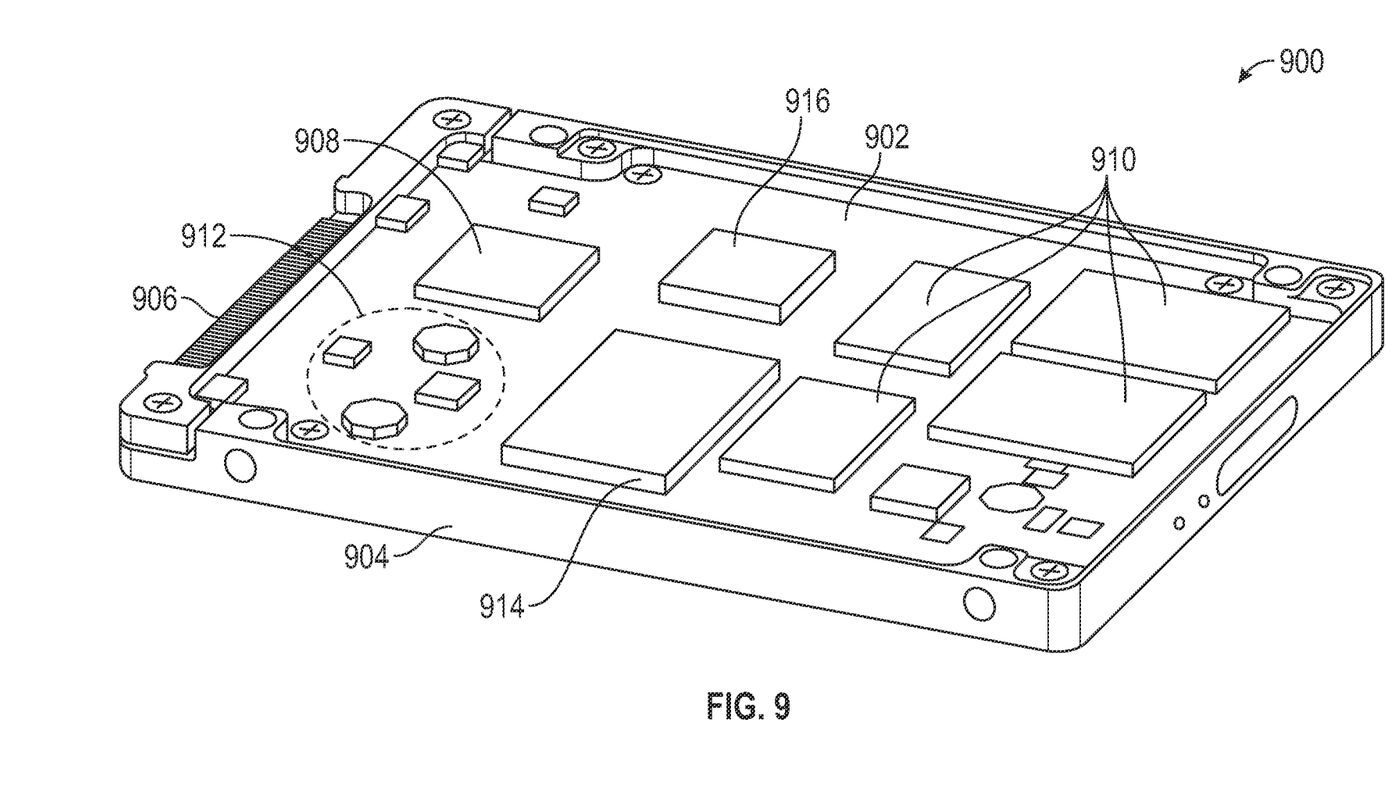
FIG. 9 is an oblique view of a solid state drive (SSD) on which embodiments of the present disclosure may be used.

FIG. 9 illustrates an oblique view of a solid state drive (SSD) 900 that may be used as an RBOD disc in embodiments of the disclosure is shown. SSD 900 includes one or more printed circuit boards (PCBs) or circuit card assemblies 902 and typically includes a protective, supportive housing 904, and one or more interface connectors 906. SSD 900 further includes a controller application specific integrated circuit (ASIC) 908 or field programmable gate array (FPGA), one or more non-volatile memory devices 910, and power regulation circuitry 912. The memory devices 910 are essentially the SSD's data storage media. SSD 900 may include erasure blocks as the physical storage locations within memory device 910, which may include Flash memory devices, for example. In some applications, SSD 900 further includes a power-backup energy storage device, such as a super-capacitor 914.

In accordance with certain aspects, the SSD 900 includes the circuit card assembly 902 that includes a connector 906 for connection to a host computer (not shown). In accordance with certain aspects, the connector 906 includes NVMe (non-volatile memory express), SCSI (small computer system interface), SAS (serial attached SCSI), FC-AL (fiber channel arbitrated loop), PCI-E (peripheral component interconnect express), IDE (integrated drive electronics), AT (advanced technology), ATA (advanced technology attachment), SATA (serial advanced technology attachment), eSATA (external SATA), PATA (parallel ATA), PCIe (peripheral component interconnect express), IEEE (institute of electrical and electronics engineers)-1394, USB (universal serial bus), compact flash, Ethernet, Thunderbolt, or other interface connector adapted for connection to a host computer. Controller ASIC 908 is configured to carry out deduplication in accordance with one or more of the methods described above.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments employ more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method, comprising:
   receiving a piece of data at an upper-layer server of a multi-tiered storage system comprising the upper-layer server and a block server;
   determining a signature for the piece of data;
   determining whether a first bloom filter stored on the upper-layer server includes the signature, the first bloom filter being a copy of a second bloom filter generated on the block server;
   responsive to determining that the first bloom filter stored on the upper-layer server includes the signature:
     sending the piece of data for storage at the block server;
     determining whether the second bloom filter stored on the block server includes the signature;
     responsive to determining that second bloom filter includes the signature, deduplicating the piece of data;
     responsive to determining that second bloom filter does not include the signature, storing the piece of data; and
   responsive to determining that the upper-layer server does not include the signature, storing the piece of data in the block server.

2. The method of claim 1, wherein receiving comprises receiving at one of a plurality of upper-layer servers communicatively coupled with a plurality of block servers, each upper-layer server of the plurality of upper-layer servers storing a plurality of first bloom filters, a first bloom filter copy of a second bloom filter for each of the plurality of block servers.

3. The method of claim 2, wherein determining whether a first bloom filter stored on the upper-layer server includes the signature comprises determining whether the plurality of first bloom filters stored on the one upper-layer server of the plurality of upper-layer servers includes the signature.

4. The method of claim 3, wherein sending the piece of data for storage at the block server comprises sending the piece of data to the block server on which the determination is made that the signature is found in the plurality of first bloom filters.

5. The method of claim 1, wherein determining a signature for the piece of data comprises breaking the piece of data into a plurality of blocks of data, and determining a signature for each block of the plurality of blocks.

6. A method, comprising:
   storing, for each block server of a plurality of block servers, a set of deduplication signatures for data on the respective block server;
   generating a block server bloom filter for the set of deduplication signatures on each respective block server;
   storing each block server bloom filter on its respective block server;
   replicating each block server bloom filter to each of the plurality of upper-layer servers;
   receiving, at one upper-layer server of the plurality of upper-layer servers, a piece of data to be stored;
   determining a signature for the piece of data; and
   deduplicating the piece of data based on matching the determined signature to a signature stored in a one of the plurality of replicated bloom filters; and
   storing the piece of data to a block server based on not matching the determined signature to any signature stored in the plurality of replicated bloom filters.

7. The method of claim 6, wherein deduplicating comprises:
   checking the plurality of replicated bloom filters for a bloom filter match for the determined signature; and
   when a match for the determined signature is found in a bloom filter of the plurality of replicated bloom filters stored on the upper-layer server:
     sending the piece of data for storage at the block server where the match is found in the bloom filter of the plurality of replicated bloom filters stored in the one upper-layer server;
     verifying, at the block server, whether an actual match of the piece of data is present, deduplicating the piece of data when an actual match is found, and storing the piece of data when an actual match is not found.

8. The method of claim 7, and further comprising when a match for the determined signature is not found in a bloom filter of the plurality of bloom filters stored on the upper-layer server, storing the piece of data in the block server where the match is found in the bloom filter of the plurality of bloom filters stored in the one upper-layer server.

9. The method of claim 6, wherein replicating the plurality of bloom filters comprises storing the bloom filter for each block server to each of the plurality of upper-layer servers on a predetermined schedule.

10. The method of claim 6, wherein receiving comprises receiving at one of a plurality of upper-layer servers, each upper-layer server of the plurality of upper-layer servers storing a plurality of bloom filters, a bloom filter for each of the block servers.

11. The method of claim 10, wherein checking a bloom filter comprises checking the plurality of bloom filters for the upper-layer server.

12. The method of claim 11, wherein sending the piece of data for storage at the block server comprises sending the piece of data to the block server on which the signature match is found in the plurality of bloom filters.

13. The method of claim 6, wherein determining a signature for the piece of data comprises breaking the piece of data into a plurality of blocks of data, and determining a signature for each block of the plurality of blocks.

14. The method of claim 6, wherein verifying comprises checking the bloom filter for the block server.

15. A system, comprising:
   an upper-layer server configured to receive data for storage in the system;
   a block server, the block server communicatively coupled to the upper-layer server to store the received data; and
   a controller, the controller configured to deduplicate the received data and data stored on the block server by:
     determining a signature for the received data;
     determining whether a first bloom filter stored on the upper-layer server includes the signature, the first bloom filter being a copy of a second bloom filter generated on the block server;
     responsive to determining that the first bloom filter stored on the upper-layer server includes the signature:
       sending the received data for storage at the block server;
       determining whether the second bloom filter stored on the block server includes the signature;
       responsive to determining that second bloom filter includes the signature, deduplicating the received data;

responsive to determining that second bloom filter does not include the signature, storing the received data; and responsive to determining that the upper-layer server does not include the signature, storing the received data in the block server.

16. The system of claim 15, wherein:

the block server is configured to store a set of deduplication signatures for its data, and a bloom filter for its set of deduplication signatures; and the upper-layer server is configured to store a bloom filter for the block server.

17. The system of claim 15, wherein the controller is further configured to receive data by receiving at one of a plurality of upper-layer servers, each upper-layer server of the plurality of upper-layer servers storing a plurality of bloom filters, a bloom filter for each of the block servers.

18. The system of claim 15, wherein the upper-layer server comprises a plurality of upper-layer servers, and wherein the block server comprises a plurality of block servers, wherein each upper-layer server is configured to store a bloom filter for each of the plurality of block servers, and wherein each block server is configured to store a set of deduplication signatures for its data, and a bloom filter for its set of deduplication signatures.

* * * * *